(12) United States Patent
Joe et al.

(10) Patent No.: US 9,681,271 B2
(45) Date of Patent: Jun. 13, 2017

(54) APPARATUS AND METHOD FOR PROVIDING LOCATION-BASED SERVICE USING INDOOR POSITIONING

(71) Applicant: SK TELECOM CO., LTD., Seoul (KR)

(72) Inventors: Moonok Joe, Seoul (KR); Kwanjae Lee, Goyang-si (KR); Sunyeon Kim, Seoul (KR); Kyungtae Kim, Seoul (KR); Minhyoung Lee, Namyangju-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/961,491

(22) Filed: Dec. 7, 2015

(65) Prior Publication Data

US 2016/0088445 A1   Mar. 24, 2016

Related U.S. Application Data

(63) Continuation of application No. PCT/KR2014/007428, filed on Aug. 11, 2014.

(30) Foreign Application Priority Data

Aug. 13, 2013  (KR) .......................... 10-2013-0096066

(51) Int. Cl.
*H04W 24/00* (2009.01)
*H04W 4/04* (2009.01)
(Continued)

(52) U.S. Cl.
CPC ............. *H04W 4/043* (2013.01); *H04W 4/02* (2013.01); *H04W 64/00* (2013.01); *H04W 88/18* (2013.01)

(58) Field of Classification Search
CPC ..... H04W 4/043; H04W 88/18; H04W 64/00; H04W 4/02
See application file for complete search history.

(56) References Cited

U.S. PATENT DOCUMENTS

2010/0291907 A1   11/2010   MacNaughtan et al.
2014/0066098 A1*   3/2014   Stern .................... H04W 4/043
                                              455/456.3
(Continued)

FOREIGN PATENT DOCUMENTS

KR   1020110013613   *  3/2011
KR   1020110031174 A     3/2011
(Continued)

OTHER PUBLICATIONS

International Search Report mailed Dec. 5, 2014 for PCT/KR2014/007428.

*Primary Examiner* — Ajit Patel
(74) *Attorney, Agent, or Firm* — Hauptman Ham, LLP

(57) ABSTRACT

An apparatus for providing a location-based service includes: a rules registry unit to register an event rule information based on an inheritance module for setting rules; a positioning information acquisition unit to obtain a positioning-related information of a user terminal device from a positioning apparatus; an event determining unit to determine whetheran event with respect to the event rule information occurs or not by using the positioning-related information to generate a determination result information; an event processing unit to generate a process information based on the determination result information; and a service providing unit configured to transmit the process information to the user terminal device.

16 Claims, 5 Drawing Sheets

(51) Int. Cl.
    *H04W 4/02*     (2009.01)
    *H04W 64/00*     (2009.01)
    *H04W 88/18*     (2009.01)

(56) References Cited

U.S. PATENT DOCUMENTS

| | | | | |
|---|---|---|---|---|
| 2014/0155085 A1* | 6/2014 | Kosseifi | ............... | H04W 24/10 |
| | | | | 455/456.1 |
| 2014/0155095 A1* | 6/2014 | Albanes | ............... | H04W 4/22 |
| | | | | 455/456.3 |
| 2014/0162693 A1* | 6/2014 | Wachter | ............... | H04W 4/021 |
| | | | | 455/456.3 |

FOREIGN PATENT DOCUMENTS

| | | | |
|---|---|---|---|
| KR | 1020120042499 | * | 5/2012 |
| KR | 1020120042499 A | | 5/2012 |

* cited by examiner

APPARATUS AND METHOD FOR PROVIDING LOCATION-BASED SERVICE USING INDOOR POSITIONING

CROSS-REFERENCE TO RELATED APPLICATIONS

The present application is a continuation of International Patent Application No. PCT/KR2014/007428, filed Aug. 11, 2014, which is based on and claims the benefit of priority to Korean Patent Application No. 10-2013-0096066, filed on Aug. 13, 2013. The disclosures of the above-listed applications are hereby incorporated by reference herein in their entirety.

TECHNICAL FIELD

Some embodiments of the present disclosure relate to an apparatus and method for providing a location-based service using indoor positioning.

BACKGROUND

The statements in this section merely provide background information related to the present disclosure and do not necessarily constitute prior art.

A location-based service (LBS) is in high demand thanks to its wide usability and convenience. In recent years, a new network-based positioning technology has been developed for GPS shadow areas such as the inside or basement of buildings.

In a typical indoor positioning system, provision of the LBS for a mobile terminal software application involves the execution of the relevant indoor positioning API (application programming interface). When a continuous monitoring or tracking is needed, a polling scheme that involves a main server is used to provide the indoor positioning API with positioning information per request.

The inventor(s) has noted that the typical indoor positioning system, simply utilizing the APIs, heavily relies on the software engineer's endeavor for providing various application programs. Therefore, The inventor(s) has experienced that it is not easy to promptly respond to the modification and customization needs for such applications.

SUMMARY

In some embodiments of the present disclosure, an apparatus for providing a location-based service includes a rules registry unit configured to register an event rule information based on an inheritance module for setting rules, a positioning information acquisition unit configured to obtain a positioning information of a user terminal device from a positioning apparatus, an event determining unit configured to determine whether an event with respect to the event rule information occurs or not by using the positioning information to generate a determination result information, an event processing unit configured to generate process information based on the determination result information, and a service providing unit configured to transmit the process information to the user terminal device.

In another embodiment of the present disclosure, a method performed by an apparatus for providing a location-based service includes in a data processor the following processes: recording an event rule information based on an inheritance module for setting rules, obtaining a positioning information of a user terminal device from a positioning apparatus, performing an event determination including determining whether an event with respect to the event rule information occurs or not by using the positioning information and generating a determination result information, processing an event to generate a process information based on the determination result information, and providing a service including transmitting the process information to the user terminal device.

DETAILED DESCRIPTION

Some embodiments of the present disclosure provide an apparatus and method for providing a location-based service using indoor positioning. The indoor location-based service exemplarily embodied in the present disclosure provides a user terminal device with a predetermined operation corresponding to an event under an event rule upon occurrence of the event, based on a positioning information received from a positioning device.

Hereinafter, at least one embodiment of the present disclosure will be described in detail with reference to the accompanying drawings.

Figure 1:
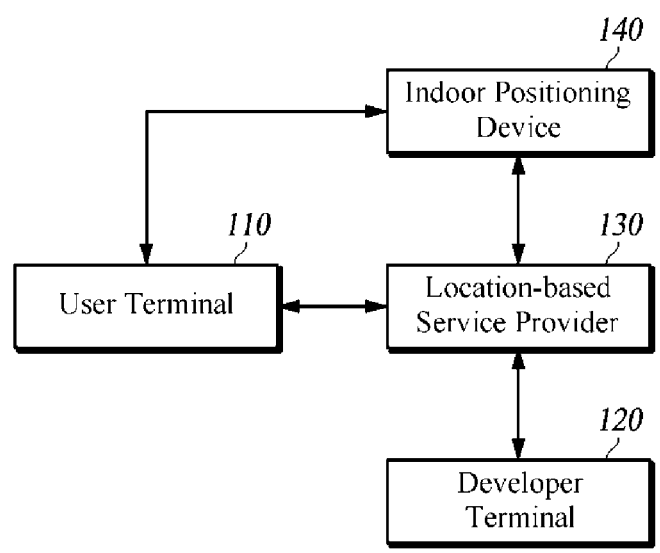
FIG. 1 is a schematic block diagram of a location-based service system according to at least one embodiment of the present disclosure.

FIG. 1 is a schematic block diagram of a location-based service system according to at least one embodiment of the present disclosure.

The location-based service system according to at least one embodiment includes a user terminal device 110 (hereinafter, referred to as "a user terminal"), a developer terminal device 120 (hereinafter, referred to as "a developer terminal"), a location-based service provider 130 and an indoor positioning device 140, but not limited thereto. Each of the user terminal 110, the developer terminal 120, the location-based service provider 130 and the indoor positioning device 14 is implemented by, or includes, one or more processors and/or application-specific integrated circuits (ASICs) specified for respectively corresponding operations and functions described herein.

The user terminal 110 is a mobile communication terminal device (or user equipment) capable of transmitting and receiving data in response to user's key manipulation, by working in conjunction with a communication relay such as an indoor access point (AP). The user terminal 110 is one of a tablet or desktop PC (personal computer), a laptop, a smart phone, a personal digital assistant (PDA) and a mobile communication terminal. The user terminal 110 includes (i) a communication device such as a communication modem or the like for performing communications with various types of devices, wired/wireless communication networks (e.g., the Internet, wireless personal area network (WPAN), wireless local area network (WLAN), WiBro (wireless broadband, aka WiMax) network), or mobile communication networks and the like or through various communication interfaces such as a cable, a universal serial bus (USB) and the like, (ii) a memory for storing various programs and data that perform various functions, and (III) a microprocessor to execute a program so as to perform calculation, operation and control, and the like. The user terminal 110 is adapted to perform voice and data communications in conjuction with an AP(s), wired/wireless communication networks (e.g., the Internet, wireless personal area network (WPAN), wireless local area network (WLAN), WiBro (wireless broadband, aka WiMax) network), or mobile communication networks and the like or through various communication interfaces such as a cable, a universal serial bus (USB) and the like. The user terminal 110 is a device which has a memory for storing various programs and data that perform various functions, and/or a protocol for communicating with another communication terminal device via the AP and the communication networks. The user terminal 110 includesa microprocessor for executing the program for computing and control so as to perform calculation, operation and control, and the like. According to at least one embodiment, the memory includes a non-transitory computer-readable recording/storage medium such as a random access memory (RAM), a read only memory (ROM), a flash memory, an optical disk, a magnetic disk, a solid-state disk (SSD), and the like. According to at least one embodiment, the microprocessor is programmed for performing one or more of operations and/or functionality described herein. According to at least one embodiment, the microprocessor is implemented, in whole or in part, by specific purpose hardware (e.g., by one or more application specific integrated circuits or ASICs).

The user terminal 110 also includes input units (not shown in FIG. 1) such as one or more buttons, a touch screen, a mic and so on, and output units (not shown in FIG. 1) such as a display, an indicator and so on to thereby implement user manipulation(s). It is capable of executing a positioning application program (not shown) via an input through the touchscreen according to the user manipulation. The positioning application refers to an application downloaded and installed via an installation application store when the user terminal 110 is a smart phone and also refers to a virtual machine (VM) and application downloaded via a communication server in case the terminal 110 is a feature phone.

The user terminal 110 according to at least one embodiment is linked to a plurality of indoor APs installed indoors to acquire (or receive) radio environment information and to transmit the acquired radio environment information to the indoor positioning device 140. Here, the radio environment information refers to, e.g., an AP device MAC address information, AP identification information (SSID), signal strength information or received signal strength indicator (RSSI), signal transmission time information, wireless local area network (LAN) frequency information, latitude and/or longitude information, etc.

The user terminal 110 provides a sensor data of a movement and/or motion of the terminal 110 upon sensing by using a plurality of sensors included therein and transmits the sensor data to the indoor positioning device 140. The user terminal 110 transmits the movement or sensor data generated by using a plurality of sensors such as, but not limited to, an accelerator sensor, a geomagnetic sensor, a gyro sensor, an altitude sensor, etc. to the indoor positioning device 140. Here, the sensor data include among others an acceleration information, a gyro information, a geomagnetic information, an altitude information, etc.

The user terminal 110 is equipped with a positioning application and performs a location-based service. The user terminal 110 executes the positioning application according to a user manipulation or command and receives a location-based service from the location-based service provider 130. In some embodiments, the positioning application is installed in the user terminal 110, or embedded in an operating system (OS) installed in the terminal 110, or installed in the OS of the user terminal 110 by way of a user manipulation or a command. The plurality of sensors are controlled and operated by the microprocessor of the user terminal in a manner of executing the operating system (OS) installed in the user terminal 110 or independent signals or commands.

The developer terminal 120 refers to a terminal device for transmitting and receiving a variety of data to and from the location-based service provider 130 according to a key manipulation of a developer. The developer terminal 120 includes, but not limited to, any one of a tablet or desktop PC, a laptop, a smart phone, a PDA and a mobile communication terminal. The developer terminal 110 refers to a terminal including a memory for storing a program or a protocol for exchanging data including a predetermined module (software) with an external device using a predetermined program and a microprocessor for executing programs for computations and operations.

The developer terminal 120 according to at least one embodiment inherits and implements an operation module for setting rules that are obtained from a communication service provider or an external device using at least one of a plurality of programming languages such as C, C++, Java, C#, etc. It transmits the implemented operation module to the location-based service provider 130, and registers an event rule information. Here, the operation module is updated by a predetermined period based on a developer input and is also updated on a need basis.

The location-based service provider 130 receives positioning-related information from the indoor positioning device 140, determines occurrence or non-occurrence of an event with respect to the event rule information by using the received positioning-related information, generates a process information having process operations according to the result of the determination, and transmits the process information to the user terminal 110. Herein, the process information refers to an information including a list of informations that correspond to an occurred event with respect to the event rule information.

The location-based service provider 130 receives at least one operation module for setting rules from the developer terminal 120 and records the event rule information. Here, the operation module is inherited by the developer terminal 120 from the communication service provider or the external device. The operation module is a code generated by using at least one of a plurality of programming languages such as C, C++, Java, C#, etc., or it is a rule information of an event such as a positioning state event, a terminal location event, an error message event, a set area event, a control state event, a multi-operation event, etc.

The location-based service provider 130 acquires positioning-related information of the user terminal 110 from the indoor positioning device 140, determines an event occurrence or non-occurrence with respect to the event rule information by using the positioning-related information, and generates a determination result information. Here, the positioning-related information includes a terminal location information, an operation state information, an error message information, a map coordinate information, etc. For example, when the positioning-related information contains a coordinate value (6, 4), which is the terminal location information, the location-based service provider 130 compares the coordinate value (6, 4) with a predetermined coordinate value and generates a determination result information upon determining the terminal location event occurrence or non-occurrence with respect to the event rule information.

The location based service provider 130 generates the process information having process operations corresponding to the event rule information based on the determination result information and transmits the process information to the user terminal 110. For example, the location-based service provider 130 generates a terminal location change message which is a processed operation with respect to a terminal location event rule information, based on the determination result information indicating the terminal location change and transmits the generated message of the terminal location change to the user terminal 110. Here, the location based service provider 130 is described to take a message format in transmitting the process information corresponding to the event rule information to the user terminal 110, but the present disclosure is not limited thereto. For example, the location based service provider 130 transmits the process information to the user terminal 110 to change or update the operation of the positioning application run in the user terminal 110.

The indoor positioning device 140 generates and transmits the positioning-related information of the user terminal 110 to the location-based service provider 130.

The indoor positioning device 140 according to at least one embodiment receives the radio environment information and the sensor data from the user terminal 110 and generates the positioning-related information by using the radio environment information and the sensor data. Here, the radio environment information includes MAC address information, AP identification information (SSID), signal strength information (received signal strength indicator (RSSI)), signal transmission time information, wireless local area network (LAN) frequency information, latitude and/or longitude information, etc. The sensor data include acceleration information, gyro information, geomagnetic information, altitude information, etc. measured by the plurality of sensors working with the user terminal 110.

The indoor positioning device 140 calculates an initial terminal location value based on the radio environment information by using a triangulation and fingerprinting method, calculates a terminal movement location value of the user terminal 110 moving based on the initial terminal location value by using the sensor data and generates terminal location information including the initial terminal location value and the terminal movement location value.

Although the indoor positioning device 140 generates only the terminal location information as the positioning-related information, the present disclosure is not limited thereto and the positioning-related information includes an operation state information of the indoor positioning device 140, an error message information of a positioning error and a map coordinate information for indoor positioning.

The indoor positioning device 140 generates the positioning-related information that includes a terminal location information, an operation state information, an error message information, a map coordinate information, etc. and transmits the positioning-related information to the location-based service provider 130.

Figure 2:
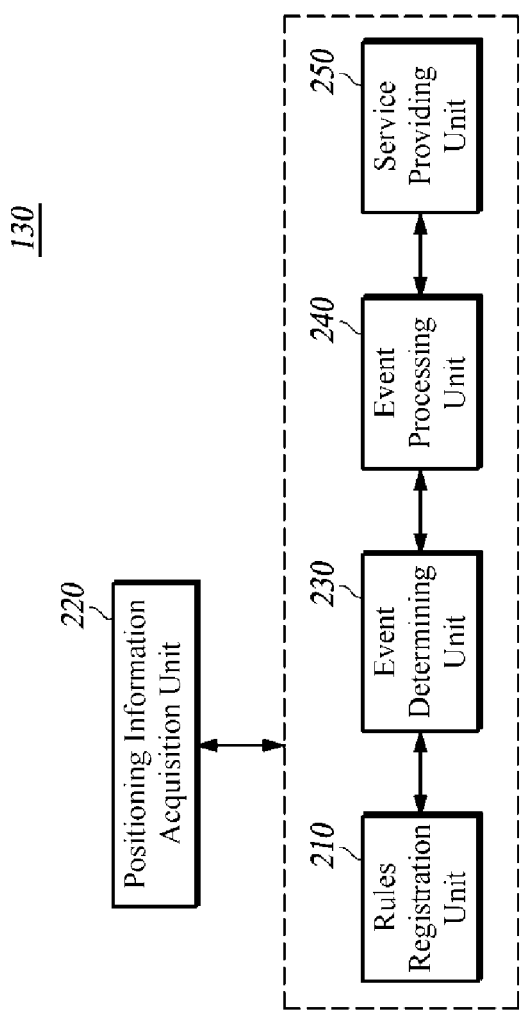
FIG. 2 is a schematic block diagram of a location-based service provider according to at least one embodiment of the present disclosure.

FIG. 2 is a schematic block diagram of a location-based service provider according to at least one embodiment of the present disclosure.

The location-based service provider 130 according to at least one embodiment includes a rules registry unit 210, a positioning information acquisition unit 220, an event determining unit 230, an event processing unit 240 and a service providing unit 250. In at least one embodiment, the location-based service provider includes the rules registry unit 210, the positioning information acquisition unit 220, the event determining unit 230, the event processing unit 240 and the service providing unit 250 only, to which the present disclosure is not limited. Each of the rules registry unit 210, the positioning information acquisition unit 220, the event determining unit 230, the event processing unit 240 and the service providing unit 250 is implemented by, or includes, one or more processors and/or application-specific integrated circuits (ASICs) specified for respectively corresponding operations and functions described herein.

The rules registry unit 210 receives the operation module from the developer terminal 120 and records the event rule information. Here, the operation module is inherited from the communication service provider or the external apparatus by the developer terminal 120 and is a code generated by using at least one of a plurality of programming languages such as C, C++, Java, C#, etc.

The rules registry unit 210 registers the event rule information based on the operation module. For example, the rules registry unit 210 receives an operation module "onUpdateStateChanged( )", "onPositionChanged( )", "onMessageReceived( )", "onControllerStateChanged( )", "onZoneChanged( )", or "onEvent( )" from the developer terminal 120 and records the event rule information that includes a positioning state event, a terminal location event, an error message event, a set area event, a control state event, a multi-operation event, etc. Here, the positioning state event refers to an event for an operation of the indoor positioning device 140, such as ON/OFF, inspection, reset, etc. The terminal location event refers to an event regarding change in positioning value of the user terminal 110 in the indoor positioning device 140. The error message event refers to an event indicating occurrence of an error in the positioning value of the indoor positioning device 140. The set area event refers to an event regarding change in coordinate value of an area of a pre-set map. The control state event refers to an event regarding change in event rule information. The multi-operation event refers to an event regarding occurrence of one or more events.

The positioning information acquisition unit 220 is linked to the indoor positioning device 140 and acquires positioning-related information of the user terminal 110. Here, the positioning-related information includes the terminal location information, the operation state information, the error message information and the map coordinate information, etc.

The event determining unit 230 determines the occurrence or non-occurrence of an event of the event rule information by using the positioning-related information and generates the determination result information.

The event determining unit 230 generates the positioning state change information as the determination result information upon determining whether the positioning state has been changed using the operation state information included in the positioning-related information. For example, the event determining unit 230 generates the determination result information upon determining that the event of the positioning state event rule information has occurred, if the positioning-related information includes information indicating that the operation of the positioning apparatus 140 has been changed to the OFF state.

The event determining unit 230 generates the terminal location change information as the determination result information upon determining whether the positioning state has been changed by using the terminal location information included in the positioning-related information. For example, when the positioning-related information includes a coordinate value (6, 4) which is the terminal location information, the event determining unit 230 compares the coordinate value (6, 4) with a predetermined coordinate value and generates the determination result information upon determining whether the event of the terminal location event rule information occurs or not.

The event determining unit 230 generates the error occurrence information as the determination result information upon determining whether the positioning result has an error using error message information included in the positioning-related information. For example, when the positioning-related information includes an error code which corresponds to the error message information, the event determining unit 230 determines whether the event of error message event rule information occurs or not based on the error code, and generates the determination result information based on the determination. That is, the event determining unit 230 generates the determination result information upon determining the occurrence or non-occurrence of the event of error message event rule information based on the error code.

The event determining unit 230 generates the determination result information upon determining whether the event of error message event rule information occurs or not based on the error code. That is, the determination result information includes and indicates corresponding information of whether the event of error message event rule information occurs or not.

The event determining unit 230 generates the determination result information having a set area change information upon determining whether a set area has been changed by using map coordinate information included in the positioning-related information. For example, the event determining unit 230 generates the determination result information by determining the occurrence or non-occurrence of the event of set area event rule information depending on whether a pre-set area A has been changed by using the coordinate information (1,1) to (4,4) of the area A included in the positioning-related information.

The event processing unit 240 generates the process information based on the determination result information. The event processing unit 240 according to at least one embodiment generates a process information having process operations corresponding to the determination result information generated by the event determining unit 230, that is, the event rule information of the occurred event.

The event processing unit 240 generates a positioning state change message as the process information based on the positioning state event rule information of the determination result information indicating that the positioning state has been changed. For example, when the state of the terminal changes to a positioning inactivation state due to e.g., maintenance of the indoor positioning device 140, the event processing unit 240 generates, as the process information, a positioning inactivation message based on positioning state event rule information or information on the use of pre-stored terminal location information due to the positioning inactivation.

The event processing unit 240 generates the process information having a terminal location change message based on the terminal location event rule information of the determination result information indicating that the location of the terminal has been changed. The event processing unit 240 generates the process information having a positioning error message based on error message event rule information of the determination result information including error occurrence information. The event processing unit 240 generates the set area change message as the process information based on the set area event rule information of the determination result information indicating that the set area has been changed.

The event processing unit 240 is described as transmitting a change related message as the process information based on the event rule information of the determination result information, although the present disclosure is not limited thereto, and any information is transmitted as long as it is capable of providing the location-based service to the user terminal 110 based on the event rule information.

The service providing unit 250 transmits the process information to the user terminal 110.

The service providing unit 250 according to at least one embodiment transmits the process information generated by the event processing unit 240 to the user terminal 110 by using wireless short-range communication such as wireless LAN, Ultra Wideband (UWB), radio frequency, IrDA (Infrared Data Association), ZigBee, Bluetooth, etc.

In addition, the service providing unit 250 is described as transmitting the process information corresponding to the event rule information to the user terminal 110 in the form of a message, although the present disclosure is not limited thereto. For example, the service providing unit 250 transmits the process information to the user terminal 110 for enabling the same to change or update the operation of the positioning application executed in the user terminal 110.

Figure 3:
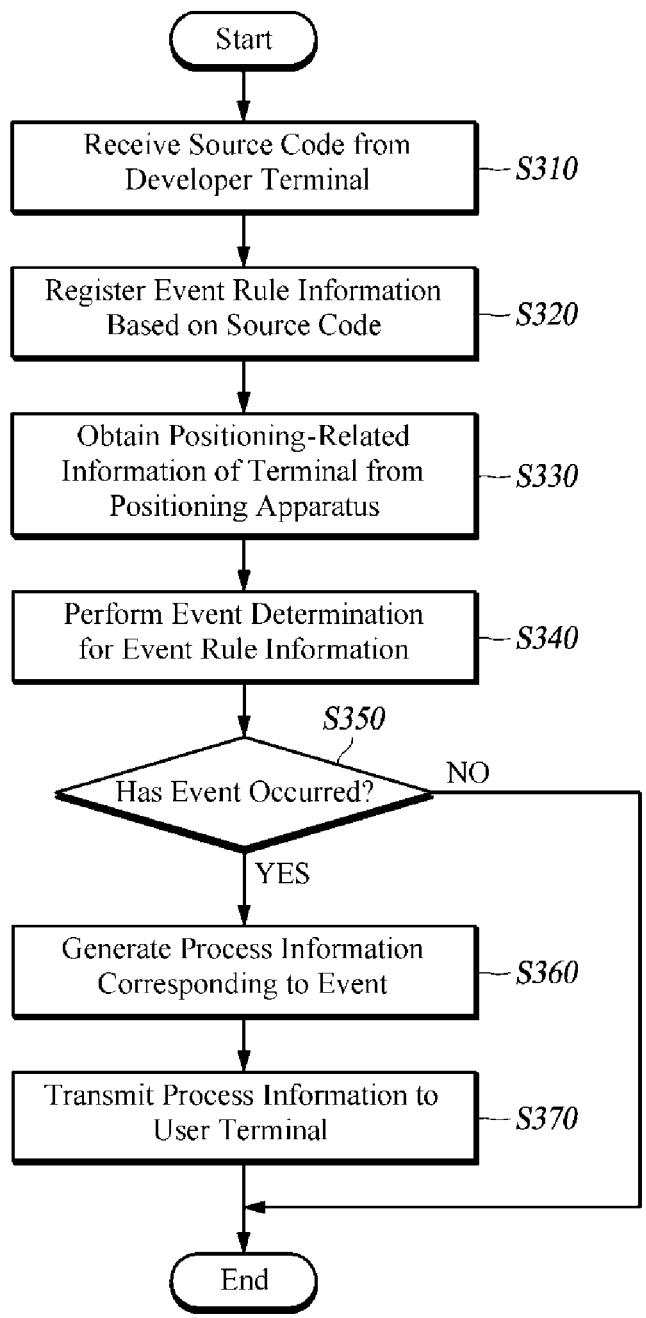
FIG. 3 is a flowchart of a location-based service providing method according to at least one embodiment of the present disclosure.

FIG. 3 is a flowchart of a location-based service providing method according to at least one embodiment of the present disclosure.

The location-based service provider 130 receives the operation module for setting rules from the developer terminal 120 (S310). Here, the operation module is inherited from the communication service provider or the external apparatus by the developer terminal 120 and is a code generated by using at least one of a plurality of programming languages.

The location-based service provider 130 records the event rule information based on the received operation module (S320). Here, the event rule information includes a positioning state event, a terminal location event, an error message event, a set area event, a control state event, a multi-operation event, etc.

The location-based service provider 130 acquires the positioning-related information of the user terminal 110 from the indoor positioning device 140 (S330). Here, the positioning-related information includes terminal location information, operation state information, error message information, map coordinates information, etc.

In step S340, the location-based service provider 130 determines whether the event of the event rule information registered occurs or not in step S320. More specifically, the location-based service provider 130 determines the occurrence or non-occurrence of the event of the event rule information using the positioning-related information and generates the determination result information in step S340. For example, the location-based service provider 130 compares a coordinate value (4, 3) which is the terminal location information included in the positioning-related information with a pre-stored coordinate value and generates the determination result information obtained by determining that the event of the terminal location event rule information has occurred upon determining that the location of the terminal has been changed.

The location-based service provider 130 generates the process information corresponding to the event based on the event rule information (S360), when the determination result information generated in step S340 indicates occurrence of the event (S350). For example, when the determination result information indicating that the event has occurred by change in location of the terminal is generated, the location-based service provider 130 generates the terminal location change message as the process information based on the terminal location event rule information of the determination result information.

The location-based service provider 130 transmits the process information to the user terminal 110 (S370). Here, the location-based service provider 130 is described as transmitting the process information corresponding to the event rule information in the form of a message, although the process information is transmitted to the user terminal 110 for use in changing or updating the operation of the positioning application executed in the user terminal 110.

The location-based service provider 130 terminates the process of providing the location-based service when the determination result information generated in step S340 indicates non-occurrence of the event.

Steps S310 to S370 are described as being sequentially performed in the example shown in FIG. 3, though they merely instantiate a technical idea of some embodiments of the present disclosure. Therefore, a person having ordinary skill in the pertinent art could appreciate that various modifications, additions, and substitutions are possible by changing the sequences described in FIG. 3 or by executing two or more steps from S310 to S370 in parallel, without departing from the gist and nature of the embodiments of the present disclosure, and hence FIG. 3 is not limited to the illustrated chronological sequence.

The operation of the LBS providing apparatus 130 according to the embodiment as described above in FIG. 3 can be implemented in a computer program and recorded in a non-tranistory computer-readable recording medium. The non-transitory computer-readable recording medium with a computer program recorded for implementing the operation of the LBS providing apparatus 130 includes any kinds of recording devices for storing data that can be read by a computer system. Such non-transitory computer-readable recording/storage medium includes, for example a read only memory (ROM), a random access memory (RAM), a CD-ROM, a magnetic tape, a floppy disk, and optical data storage devices. The non-transitory computer-readable recording medium is also distributed to computer systems connected to a network, and stores and execute the computer readable code in a distributed fashion. Functional programs, code and code segments for implementing the present embodiments will be able to be easily construed by programmers who has ordinary skill in the art to which the present embodiments pertain.

Figure 4:
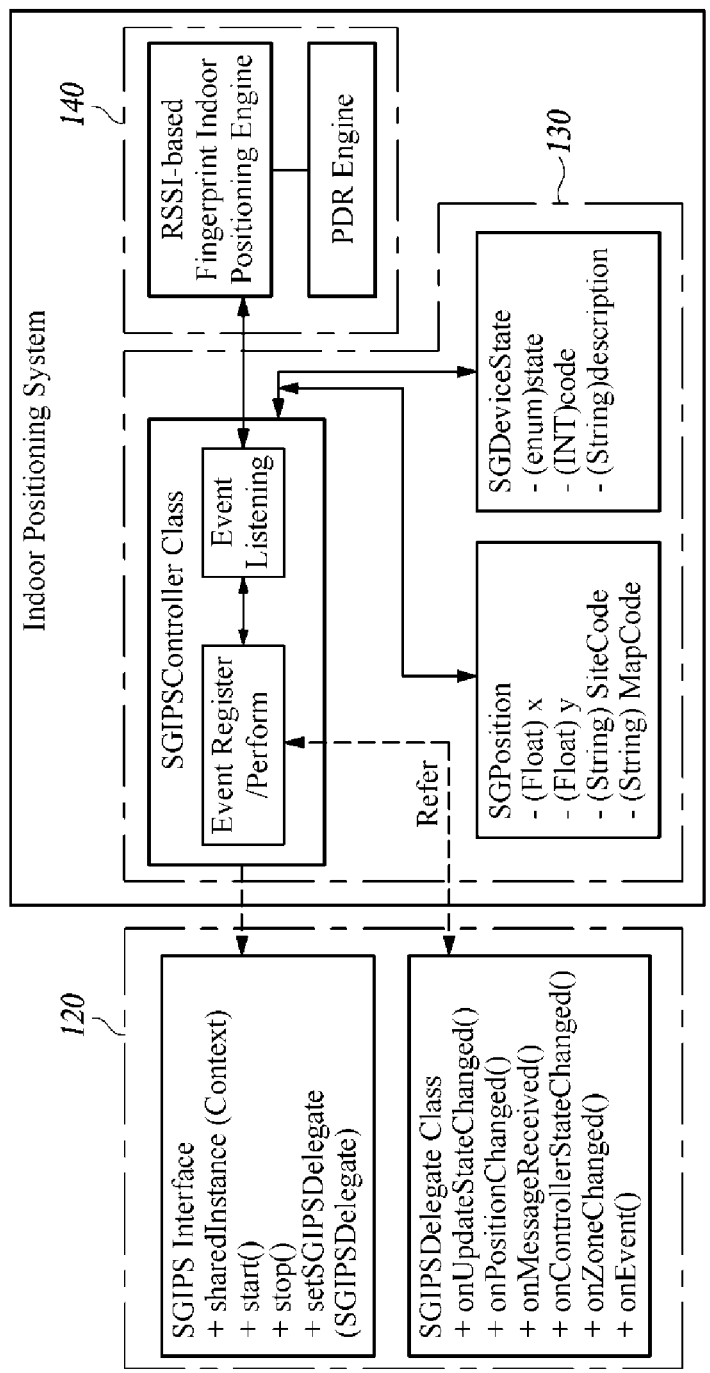
FIG. 4 is an exemplary diagram of a method of generating, by a location-based service provider, event result information according to at least one embodiment of the present disclosure.

FIG. 4 is an exemplary diagram of a method for generating, by a location-based service provider, event result information according to at least one embodiment of the present disclosure.

As shown in FIG. 4, the developer terminal 120 is implemented via inheritance of an "SGIPSDelegate class" for setting rules based on developer input and transmits the "SGIPSDelegate class" to the location-based service provider 130 via an "SGIPS interface" to register the event rule information.

The location-based service provider 130 receives the operation module "onUpdateStateChanged( )", "on PositionChanged( )", "onMessageReceived( )", "onControllerStateChanged( )", "onZoneChanged( )", or "onEvent( )" from the developer terminal 120 and registers the event rule information including a positioning state event, a terminal location event, an error message event, a set area event, a control state event, a multi-operation event, etc.

The location-based service provider 130 acquires the positioning-related information of the user terminal 110 from the indoor positioning device 140, determines whethe the event of the event rule information occurs or not by using the acquired positioning-related information, and generates the determination result information. Here, the positioning-related information includes the terminal location information, the operation state information, the error message information and the map coordinate information, etc. Here, the indoor positioning device 140 calculates the positioning-related information using a triangulation and fingerprinting method based on received signal strength information (RSSI) or a pedestrian dead recognition (PDR) method for performing positioning by using measured sensor data generated by a sensor.

The location-based service provider 130 generates a process information having process operations corresponding to the event rule information based on the determination result information generated by checking the terminal location information, the operation state information, the error message information, the map coordinate information, etc. included in the positioning-related information and transmits the process information to the user terminal 110.

Figure 5:
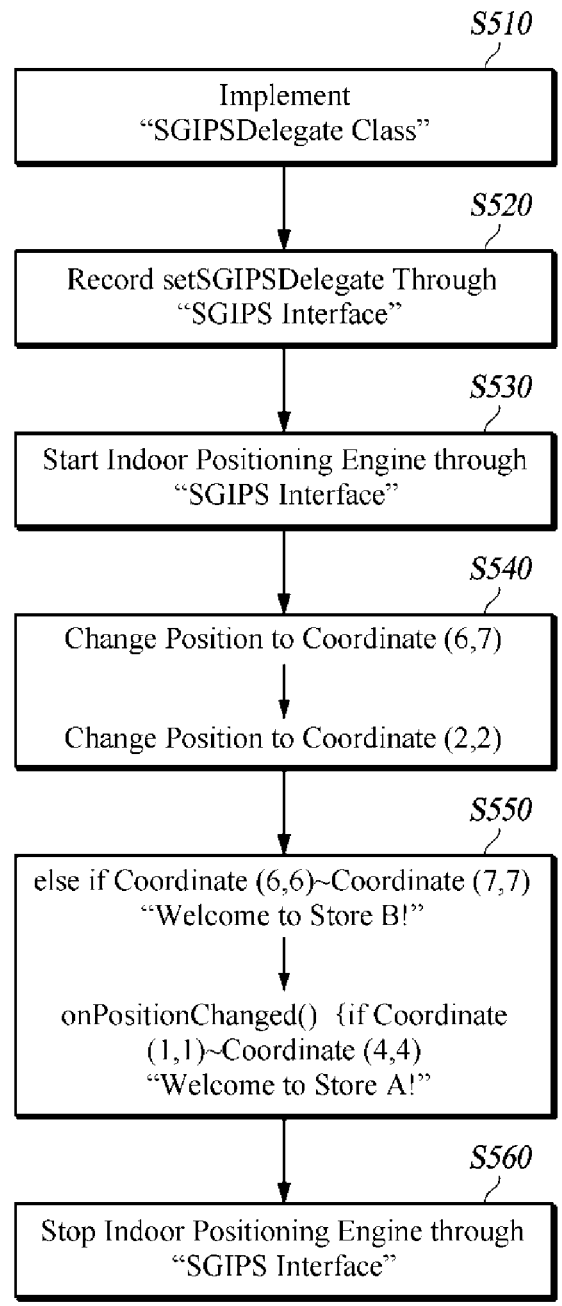
FIG. 5 is an exemplary diagram of a method of transmitting, by a location-based service provider, an event message based on positioning information according to at least one embodiment of the present disclosure.

FIG. 5 is an exemplary diagram of a method for transmitting, by a location-based service provider, an event message based on positioning-related information according to at least one embodiment of the present disclosure.

As shown in FIG. 5, the developer terminal 120 is implemented via inheritance of an "SGIPSDelegate class" for setting rules based on developer input (S510).

The developer terminal 120 transmits the "SGIPSDelegate class" to the location-based service provider 130 via an "SGIPS interface" to register the event rule information (S520).

When the state of the terminal changes to the ON state according to a start command of the developer terminal 120 (S530) and the terminal location information including (6, 7) is received from the indoor positioning device 140, the location-based service provider 130 transmits a message "Welcome to store B!" to the user terminal 110 because the terminal is in a pre-set area spanning (6, 6) to (6, 7).

In contrast, upon receiving the terminal location information including (2, 2) from the indoor positioning device 140, the location-based service provider 130 determines that the user terminal location change event has occurred (S540). The location-based service provider 130 transmits, to the user terminal 110, a message "Welcome to store A!" for a pre-set area (1, 1) to (4, 4) according to the terminal location event rule information (S550).

The location-based service provider 130 is turned off to end the process of providing the location-based service, based on an end command of the developer terminal 120 (S560).

According to various embodiments of the present disclosure, the indoor location-based service provides a user terminal device with a predetermined operation corresponding to under an event rule upon occurrence of the event, based on a positioning information received from a positioning device. Thereby, a variety of LBS application programs is able to be developed.

Moreover, from the perspective of a developer, applications is able to be modified simply by changing the event rule information, which enhances the productivity of development of LBS applications.

The positioning device exemplarily embodied in the present diclosure improves reliability of the applications by assigning a dedicated operation for each event.

Although exemplary embodiments of the present disclosure have been described for illustrative purposes, those who have ordinary skill in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand that the scope of the claimed invention is not to be limited by the explicitly described above embodiments but by the claims and equivalents thereof.

The invention claimed is:

1. An apparatus for providing a location-based service, the apparatus comprising:
a rules registry circuit configured to register an event rule information based on an inheritance circuit for setting rules;
a positioning information acquisition circuit configured to obtain a positioning-related information of a user terminal device from a positioning apparatus;
an event determining circuit configured to determine whether an event with respect to the event rule information occurs or not by using the positioning-related information to generate a determination result information;
an event processing circuit configured to generate a process information based on the determination result information; and
a service providing circuit configured to transmit the process information to the user terminal device,
wherein the rules registry circuit is configured to acquire the inheritance circuit implemented via an inheritance from a developer terminal device, and
wherein the inheritance circuit is made modifiable by the developer terminal device at a predetermined period or according to a request for changing the event rule information.

2. The apparatus of claim 1, wherein the event determining circuit is configured to generate a positioning state change information obtained by determining whether a positioning state has been changed by using an operation state information included in the positioning-related information, when the event rule information contains a positioning state event, and
the event processing circuit generates a positioning state change message as the process information based on the positioning state change information.

3. The apparatus of claim 1, wherein the event determining circuit generates a terminal location change information obtained by determining whether the location of the terminal device has been changed by using a terminal location information included in the positioning-related information, when the event rule information contains a terminal location event, and
the event processing circuit generates a terminal location change message as the process information based on the terminal location change information.

4. The apparatus of claim 1, wherein the event determining circuit generates a positioning error occurrence information obtained by determining whether a positioning error has occurred by using an error message information included in the positioning-related information, when the event rule information contains an error message event, and
the event processing circuit generates a positioning error message as the process information based on the positioning error occurrence information.

5. The apparatus of claim 1, wherein the event determining circuit generates a set area change information obtained by determining whether a set area has been changed by using a map coordinate information included in the positioning-related information, when the event rule information contains a set area event, and
the event processing circuit generates a set area change message as the process information based on the set area change information.

6. The apparatus of claim 1, wherein the event determining circuit generates a rule change information representing a control state change, when the event rule information contains rules of a positioning state, a terminal location, a message reception and a set area and contains a control state event with respect to at least one of the rules, and
the event processing circuit generates a rule change message as the process information based on the rule change information.

7. The apparatus of claim 1, wherein the event rule information includes at least one of a positioning state event, a terminal location event, an error message event, a set area event, a control state event, and a multi-operation event.

8. The apparatus of claim 1, wherein the positioning-related information includes at least one of terminal location information, operation state information, error message information, and map coordinates information.

9. A method performed by an apparatus for providing a location-based service, the method comprising:
registering an event rule information based on an inheritance circuit for setting rules;
obtaining a positioning-related information of a user terminal device from a positioning apparatus;
performing an event determination comprising determining whether an event with respect to the event rule information occurs or not by using the positioning-related information and generating a determination result information;
processing an event to generate a process information based on the determination result information; and
providing a service comprising transmitting the process information to the user terminal device,
wherein the method further comprising:
acquiring the inheritance circuit implemented via an inheritance from a developer terminal device, and
wherein the inheritance circuit is made modifiable by the developer terminal device at a predetermined period or according to a request for changing the event rule information.

10. The method of claim 9, wherein the processing of an event comprises generating a process information having process operations corresponding to the event rule information of the event by using the determination result information generated by the performing of the event determination.

11. The method of claim 9, further comprising:
generating a terminal location change information obtained by determining whether the location of the terminal device has been changed by using a terminal location information included in the positioning-related information, when the event rule information contains a terminal location event; and
generating a terminal location change message as the process information based on the terminal location change information.

12. The method of claim 9, further comprising:
generating a positioning error occurrence information obtained by determining whether a positioning error has occurred by using an error message information included in the positioning-related information, when the event rule information contains an error message event; and
generating a positioning error message as the process information based on the positioning error occurrence information.

13. The method of claim 9, further comprising:
generating a set area change information obtained by determining whether a set area has been changed by using a map coordinate information included in the positioning-related information, when the event rule information contains a set area event; and
generating a set area change message as the process information based on the set area change information.

14. The method of claim 9, generating a rule change information representing a control state change, when the event rule information contains rules of a positioning state, a terminal location, a message reception and a set area and contains a control state event with respect to at least one of the rules; and
generating a rule change message as the process information based on the rule change information.

15. The method of claim 9, wherein the event rule information includes at least one of a positioning state event, a terminal location event, an error message event, a set area event, a control state event, and a multi-operation event.

16. The method of claim 9, wherein the positioning-related information includes at least one of terminal location information, operation state information, error message information, and map coordinates information.

* * * * *